(12) United States Patent
Deguchi et al.

(10) Patent No.: US 10,058,827 B2
(45) Date of Patent: Aug. 28, 2018

(54) METHOD FOR MANUFACTURING EMULSION

(75) Inventors: Shigeru Deguchi, Yokosuka (JP); Nao Ifuku, Yokosuka (JP)

(73) Assignee: Japan Agency for Marine-Earth Science and Technology, Yokosuka-Shi, Kanagawa (JP)

( * ) Notice: Subject to any disclaimer, the term of this patent is extended or adjusted under 35 U.S.C. 154(b) by 318 days.

(21) Appl. No.: 14/239,534

(22) PCT Filed: Jun. 8, 2012

(86) PCT No.: PCT/JP2012/064759
§ 371 (c)(1),
(2), (4) Date: Jun. 19, 2014

(87) PCT Pub. No.: WO2013/027465
PCT Pub. Date: Feb. 28, 2013

(65) Prior Publication Data
US 2014/0296356 A1    Oct. 2, 2014

(30) Foreign Application Priority Data
Aug. 19, 2011    (JP) ................. 2011-179679

(51) Int. Cl.
*B01F 3/08*    (2006.01)
*B01F 17/00*   (2006.01)
*B01F 3/00*    (2006.01)

(52) U.S. Cl.
CPC ............ *B01F 3/0815* (2013.01); *B01F 17/00* (2013.01); *B01F 2003/0064* (2013.01)

(58) Field of Classification Search
CPC . B01F 3/0815; B01F 17/00; B01F 2003/0064
(Continued)

(56) References Cited

U.S. PATENT DOCUMENTS 5,921,478 A * 7/1999 Kamiwano ........... B01F 3/1207
                                                          241/15
6,821,413 B1 * 11/2004 Alkhalidl ............. C10M 175/00
                                                          208/179
(Continued)

FOREIGN PATENT DOCUMENTS

JP        2-6838 A      1/1990
JP     2000-279794     10/2000
(Continued)

OTHER PUBLICATIONS

Machine Translation of Publ. No. JP 2002-053671, published Feb. 2002, Japan Patent Office, Tokyo, Japan, online at https://dossier1.j-platpat.inpit.go.jp/tri/all/odse/ODSE_GM101_Top.action (Downloaded May 14, 2016), pp. 1-7.*

(Continued)

*Primary Examiner* — Daniel S Metzmaier
(74) *Attorney, Agent, or Firm* — Melissa M. Hayworth; Mary R. Bram; E. Joseph Gess

(57) ABSTRACT

The disclosed invention is a method for producing an emulsion, comprising the steps of: (1) causing water and a water-insoluble substance that is to be emulsified to become freely miscible under conditions of temperature and pressure in the vicinity of the vapor-liquid critical point of water; and (2) cooling the product comprised of the water-insoluble substance and water solved each other in the presence of a surfactant to obtain a liquid comprised of the water-insoluble substance dispersed in water or a liquid comprised of water dispersed in the water-insoluble substance. The present invention provides a new method for producing emulsions with high efficiency without requiring a long period of processing or a great amount of energy.

11 Claims, 11 Drawing Sheets

(58) Field of Classification Search
USPC .......... 516/76, 924, 925, 926, 927, 928, 929
See application file for complete search history.

(56) References Cited

U.S. PATENT DOCUMENTS

| | | | | |
|---|---|---|---|---|
| 7,879,301 | B2* | 2/2011 | Sugioka | B01L 3/5027 422/502 |
| 2005/0249639 | A1* | 11/2005 | Sugioka | B01L 3/5027 422/400 |
| 2009/0166261 | A1* | 7/2009 | Li | C10G 31/08 208/177 |

FOREIGN PATENT DOCUMENTS

| | | |
|---|---|---|
| JP | 2000-301194 | 10/2000 |
| JP | 2002-053671 | 2/2002 |
| JP | 2002-095953 | 4/2002 |
| JP | 2002-143661 A | 5/2002 |
| JP | 2003-164750 A | 6/2003 |
| JP | 2005-170883 | 6/2005 |
| JP | 2005-288334 A | 10/2005 |
| JP | 2010-043212 A | 2/2010 |

OTHER PUBLICATIONS

Machine Translation of Publ. No. JP 2005-170883, published Jun. 2005, Japan Patent Office, Tokyo, Japan, online at https://dossier1.j-platpat.inpit.go.jp/tri/all/odse/ODSE_GM101_Top.action (Downloaded May 14, 2016), pp. 1-8.*

Extended European Search Report issued in the corresponding to European Patent Application No. 12825894.4, dated Jun. 17, 2015.

Japanese Office Action issued in the corresponding Japanese Patent Application No. 2011-179679 w/ English translation, dated Aug. 4, 2015.

International Preliminary Report on Patentability dated Feb. 25, 2014, issued in the corresponding PCT Application No. PCT/JP2012/064759, 7 pages.

Shigeru Deguchi et al., "Bottom-Up Formulation of Dodecane-in-Water Nanoemulsions from Hydrothermal Homogeneous Solutions" Angew. Chem. Int. Ed., 52, 6409-6412 (2013).

Shigeru Deguchi et al., "MAGIQ Process: Bottom-up Formulation of Nano-Sized Oil Droplets in Water" Japan Agency for Marine-Earth Science and Technology (JAMSTEC), 20th International Symposium on Surfactants in Solution, Combra, Portugal, Jun. 22-27, 2014 (Abstract).

The 64th Division Meeting on Colloid and Surface Chemistry, the Chemical Society of Japan, the 4th Japan-Australia Symposium, Nagoya Institute of Technology, The Division of Colloid and Surface Chemistry, the Chemical Society of Japan, Nagoya, Sep. 28, 2013.

Shigeru Deguchi et al., Bottom-Up Nanoemulsification of Hydrocarbons in Water from Hydrothermal Homogeneous Solutions, 87th ACS 2013 Colloid & Surface Science Symposium, University of California Riverside, Jun. 23-26 (Abstract).

Japanese Office Action dated Feb. 28, 2017 in corresponding Patent Application No. 2016-101005 w/ English machine translation.

T. Moriya et al., "Characteristics of polyethylene cracking in supercritical water compared to thermal cracking", Polymer Degradation and Stability, 1999, vol. 65, pp. 373-386.

S. Deguchi et al., "Bottom-Up Formation of Dodecane-in-Water Nanoemulsions from Hydrothermal Homogeneous Solutions", Angew Chem. Int. Ed. 2013, 52, 6409, Supporting Information, Figure S6 only.

* cited by examiner

METHOD FOR MANUFACTURING EMULSION

CROSS-REFERENCE TO RELATED PATENT APPLICATION

The present application is a 371 National Stage filing of PCT/JP2012/064759, filed Jun. 8, 2012, which claims priority to Japanese Patent Application 2011-179679, filed on Aug. 19, 2011, the entire contents of both applications which are hereby incorporated by reference.

TECHNICAL FIELD

The present invention relates to a method for producing an emulsion. More particularly, the present invention relates to a method for producing an emulsion utilizing a uniform solution of various water-insoluble substances and water under conditions of high temperature and high pressure in the vicinity of the vapor-liquid critical point of water.

BACKGROUND OF THE INVENTION

Emulsions (emulsified products) are widely employed in various fields closely linked to daily life, such as pharmaceuticals, cosmetics, foods, inks, and paints. When water and oil are left standing without mixing, they form a single "liquid-liquid" boundary. When they are vigorously stirred, droplets of oil are dispersed in the water or droplets of water are dispersed in the oil, creating numerous "liquid-liquid" boundaries and forming an emulsion. Emulsions formed of water and oil can be either oil-in-water (O/W) type emulsions, in which oil droplets are dispersed in water, or water-in-oil (W/O) type emulsions, in which water droplets are dispersed in oil. Primary examples of O/W type emulsions are milk, mayonnaise, and cosmetic emulsions. Examples of W/O type emulsions are butter and margarine.

The main known emulsification methods are mechanical emulsification, phase-inversion emulsification, liquid phase emulsification, and D emulsification.

SUMMARY OF THE INVENTION

Each of the above conventional emulsification methods requires a long period of processing and a large amount of energy, making it difficult to efficiently conduct dispersion and emulsification.

The object of the present invention is to provide a highly efficient, new method for producing emulsions that is completely different from the conventional methods and does not require a long period of processing or a large amount of energy.

The present inventors conducted research into methods of emulsification utilizing the fact that water and various water-insoluble substances become freely miscible under conditions of high temperature and high pressure in the vicinity of the vapor-liquid critical point of water to conduct emulsion with less energy and more rapidly than by conventional methods. The present invention was devised on that basis.

The present invention is directed to the following. A method for producing an emulsion, comprising the steps of: (1) causing water and a water-insoluble substance that is to be emulsified to become freely miscible under conditions of temperature and pressure in the vicinity of the vapor-liquid critical point of water; and (2) cooling the product comprised of the water-insoluble substance and water solved each other in the presence of a surfactant to obtain a liquid comprised of the water-insoluble substance dispersed in water or a liquid comprised of water dispersed in the water-insoluble substance.

The producing method as above, wherein the temperature condition in the vicinity of the vapor-liquid critical point of water is a temperature of 300° C. or higher and the pressure condition is a pressure of 20 MPa or greater. The producing method as above, wherein the step of causing water and a water-insoluble substance that is to be emulsified to become freely miscible is implemented by mixing both the water and the water-insoluble substance under conditions of temperature and pressure at which the two become freely miscible, and then maintaining the water and the water-insoluble substance under conditions of temperature and pressure at which they become freely miscible. The producing method as above, wherein a period for the maintaining falls within a range of 0.01 to 90 seconds. The producing method as above wherein the surfactant is mixed with the product of a water-insoluble substance and water solved each other to cause the surfactant to be present in the product comprised of the water-insoluble substance and water solved each other. The producing method as above wherein, in the course of causing the water-insoluble substance and water to become freely miscible, the surfactant is added along with the water-insoluble substance to water to cause the surfactant to be present in the product comprised of a water-insoluble substance and water solved each other. The producing method as above, wherein the cooling of the product comprised of a water-insoluble substance and water solved each other in the presence of a surfactant is conducted at a rate of 100° C./second or greater to at least 100° C.

The present invention provides a new method for producing emulsions with high efficiency without requiring a long period of processing or a great amount of energy.

DETAILED DESCRIPTION

The present invention is a method for producing an emulsion. The producing method of the present invention comprises the following steps: (1) causing water and a water-insoluble substance that is to be emulsified to become freely miscible under conditions of temperature and pressure in the vicinity of the vapor-liquid critical point of water; and (2) cooling the product comprised of the water-insoluble substance and water solved each other in the presence of a surfactant to obtain a liquid comprised of the water-insoluble substance dispersed in water or a liquid comprised of water dispersed in the water-insoluble substance.

Step (1)

Supercritical Water

Figure 1A:
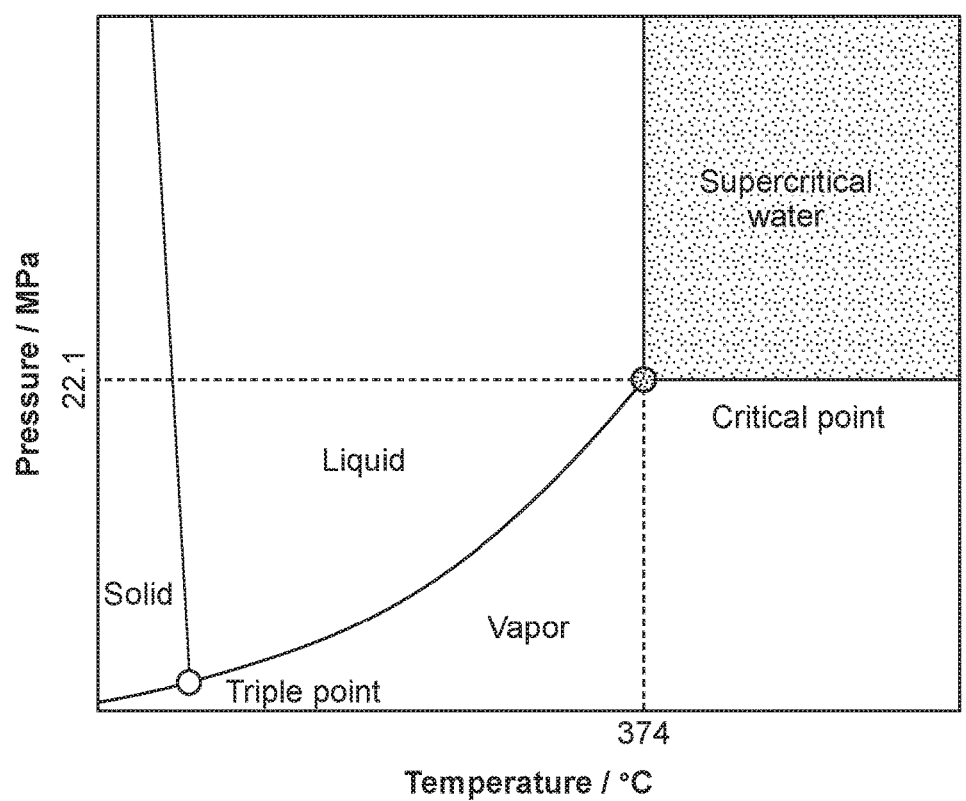
FIG. 1A shows a phase diagram of water.

Under normal conditions, water is present as a liquid and as a vapor. The boundary is the saturated vapor pressure curve. However, when the temperature and pressure increase to above a certain point, the distinction between liquid and vapor disappears. This point is known as the critical point, and water in the domain at and above this point is referred to as supercritical water. The critical temperature of water is 374° C. and the critical pressure is 22.1 MPa (FIG. 1A). Water at a temperature of 374° C. or higher and at a pressure of 22.1 MPa or greater is supercritical water.

The density of supercritical water is about ⅓ that of the liquid to about that of the liquid, and several hundred-times that of the vapor. Generally, the greater the density of a solvent, the greater the ability to dissolve substances. Thus, supercritical water has a dissolving ability that is comparable to that of the liquid. The viscosity is on a par with that of the vapor, and the diffusion coefficient is positioned between that of the vapor and that of the liquid. This means that supercritical water is of low viscosity and diffuses well. That is, supercritical water readily dissolves substances in the manner of a liquid and exhibits a high diffusion rate in the manner of a gas, thus combining the properties of a liquid and a gas. Further, supercritical water has properties the reverse of those of ordinary water, dissolving organic material well while dissolving inorganic material almost not at all. This is because as the temperature of water rises, the dielectric constant, which is about 80 at room temperature, drops to an extremely low value close to that of an organic solvent.

Due to its excellent dissolving capability, supercritical water is used to break down harmful substances such as pollutants, dioxins, and PCBs in wastewater, as well as in the decomposition treatment of coal and heavy crude oils and in the degradation and re-use of waste plastics (for example, see Japanese Unexamined Patent Publication (KOKAI) No. 2002-95953 (Patent Reference 1), Japanese Unexamined Patent Publication (KOKAI) No. 2003-164750 (Patent Reference 2), and Japanese Unexamined Patent Publication (KOKAI) No. 2000-301194 (Patent Reference 3)). Supercritical water reactors with emulsifying devices are also known (Japanese Unexamined Patent Publication (KOKAI) No. 2000-279794 (Patent Reference 4)). However, the emulsifying device on a supercritical water reactor that is described in Patent Reference 4 does not manufacture emulsions by means of supercritical water, but is a device that emulsifies a treatment liquid by the usual methods. In the emulsifying device, the emulsified liquid is fed into a supercritical water reactor with an oxidizing agent to conduct a supercritical water reaction. Patent Reference 4 does not describe a method of producing an emulsion using supercritical water. The descriptions of Patent References 1 to 4 are specifically incorporated herein in their entirety by reference.

The Water-Insoluble Substance to be Emulsified

In the producing method of the present invention, the water-insoluble substance to be emulsified is not specifically limited. Any substance exhibiting insolubility in water will do. In addition to cases of 100% insolubility in water at ordinary temperature and pressure, the term "water insolubility" as employed in the present invention includes insolubility in the form of slight solubility in water at ordinary temperature and pressure which is slightly soluble but almost not soluble. Examples of water-insoluble substances that can be emulsified are hydrocarbons, silicon oils, fluorine oils, higher alcohols, fatty acid esters, glycerin fatty acid esters, butterfat, vegetable oils, animal oils, mineral oils, and mixtures thereof. However, there is no intent to limit the water-insoluble substance that is emulsified to these substances, which have been given by way of example.

Figure 1B:
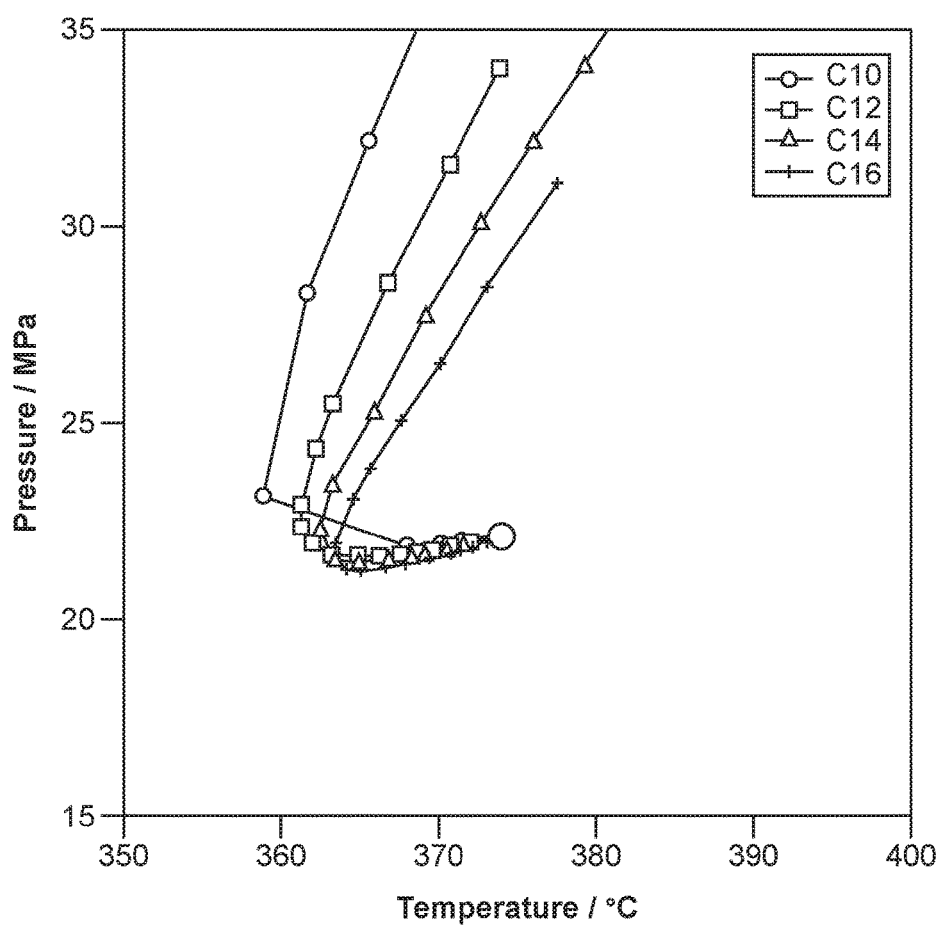
FIG. 1B shows phase diagrams of mixtures of water and hydrocarbons (decane (C10), dodecane (C12), tetradecane (C14), and hexadecane (C16)).
Figure 1C:
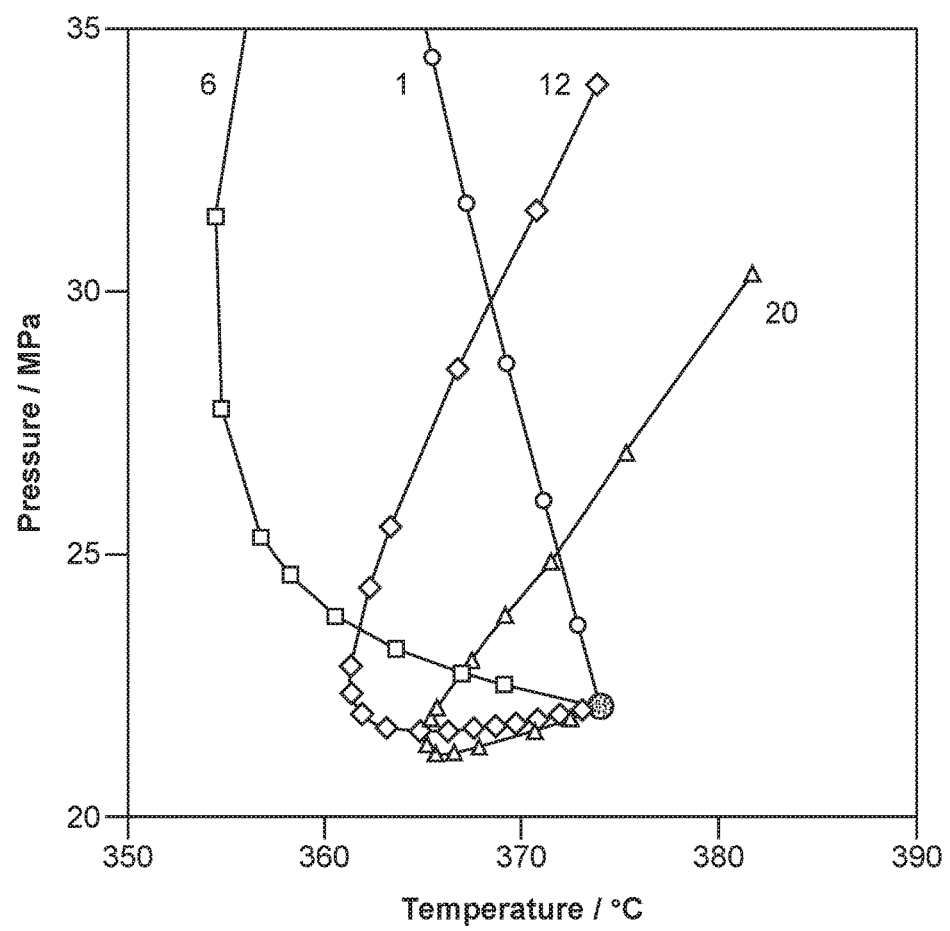
FIG. 1C shows phase diagrams of mixtures of water and hydrocarbons (hydrocarbons with typical carbon chain lengths of 1, 6, 12, and 20 where the length of the carbon chain falls within a range of 1 to 20).

Examples of methods of dissolving in water a water-insoluble substance to be emulsified are: (1) mixing and maintaining water and a water-insoluble substance under conditions of temperature and pressure at which the two become freely miscible; and (2) mixing water and a water-insoluble substance to obtain a mixture that is then subjected under conditions of temperature and pressure at which the two become freely miscible. The conditions under which water and a water-insoluble substance uniformly blend together, that is, become freely miscible, can be the conditions under which water exhibits a supercritical state. The lowest conditions under which water exhibits a supercritical state are the supercritical temperature of water of 374° C. and the critical pressure of 22.1 MPa. Thus, temperature and pressure conditions that are greater than or equal to the critical temperature and critical pressure will cause water and the water-insoluble substance to become freely miscible. However, there exist conditions at which water does not exhibit a supercritical state, that is, temperature and pressure conditions that are below the critical temperature and/or critical pressure, but which are in the vicinity of the vapor/liquid critical point of water, at which water and water-insoluble substances become freely miscible. These conditions vary with the type of water-insoluble substance, particularly with the degree of affinity with water. By conducting preparatory tests on compatibility under temperature and pressure conditions in the vicinity of the vapor-liquid critical point of water, these conditions can be readily determined. FIG. 1B shows a phase diagram of mixtures of water and hydrocarbons (decane, dodecane, tetradecane, and hexadecane). FIG. 1C shows a phase diagram of mixtures of water and hydrocarbons (typical hydrocarbons with carbon chain lengths falling within a range of from 1 to 20). In the figures, the larger white and black circles denote critical points of water. To the left of the curves extending from these critical points of water are phase separation regions. To the right are compatibility regions. According, in the method of the present invention, the conditions to the right of the curves indicated in such phase diagrams are conditions under which water and water-insoluble substances become freely miscible. Accordingly, by preparing a phase diagram in advance in this manner for the water-insoluble substance that is to be emulsified, it is possible to grasp the conditions of compatibility with water.

When employing a water-insoluble substance that is weak with regard to heat or pressure, the method of (1) mixing the water-insoluble substance with water that has been prepared in advance under conditions of temperature and pressure that render the water and the water-insoluble substance miscible in the vicinity of the vapor-liquid critical point of water, and maintaining a temperature and pressure at which the water and water-insoluble substance become freely miscible is desirable. The method of mixing the water-insoluble substance with water that has been prepared in advance under conditions of temperature and pressure that render the water and the water-insoluble substance miscible in the vicinity of the vapor-liquid critical point of water, and maintaining a temperature and pressure at which the water and water-insoluble substance become freely miscible can be implemented with the device shown in the schematic diagram of FIG. 2, for example.

Figure 2:
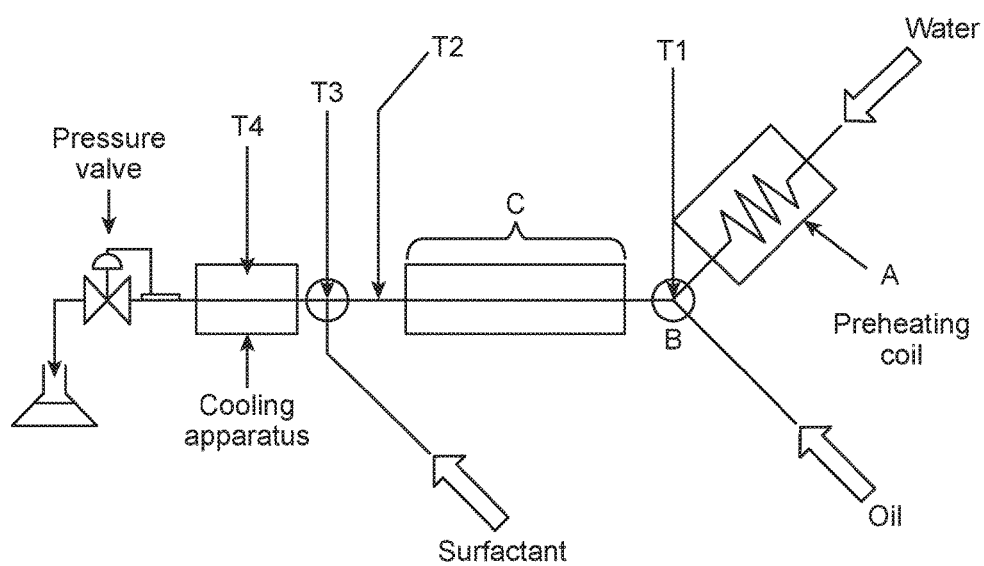
FIG. 2 shows a schematic diagram of an example of the device employed in the producing method of the present invention.

In the device shown in the schematic diagram of FIG. 2, when preparing an oil-in-water (O/W) type emulsion, water is continuously or intermittently fed under pressure into a heating device having a heating coil. A heating temperature of, for example, 300° C. or higher at which water and various water-insoluble substances become freely miscible is desirable, and a pressure of, for example 20 MPa or greater at which water and various water-insoluble substance become freely miscible, is desirable. However, as set forth above, the temperature and pressure at which water and water-insoluble substances uniformly blend will vary with the water-insoluble substance. By way of example, a resistance heater, oil bath, molten salt bath, or IR heater can be employed for heating, and a plunger pump, diaphragm pump, or cylinder pump can be employed for pressurizing. The heated and pressurized water becomes supercritical water within the heating device and is fed to a flow merger B. The flow merger B is a device in which liquids fed through multiple liquid supply ports are mixed and discharged through a single liquid outlet. The heating mechanism is also configured to permit mixing at elevated temperature. Flow merger B continuously or intermittently pressurizes and feeds a water-insoluble substance (denoted as "oil" in the figure), causing it to merge with high-temperature, high-pressure water. The water-insoluble substance that is supplied to flow merger B can be at room temperature, have been cooled, or have been heated. The water and water-insoluble substance that are merged in flow merger B continuously flow into a mixing apparatus C. The water-insoluble substance is dissolved in the water within mixing apparatus C. The temperature T2 at the outlet of mixing apparatus C is set to a temperature and pressure at which the water and water-insoluble substance can be maintained in a uniformly blended, miscible state. To that end, the temperature within flow merger B of the water-insoluble substance that is merged within flow merger B is suitably set to at least a temperature that is not lower than the temperature at which the water and the water-insoluble substance are uniformly miscible. Thus, the temperature and pressure of the heating device are suitably set so that the water that is fed to flow merger B exhibits a higher temperature and pressure than the temperature and pressure at which the water and the water-insoluble substance are uniformly miscible. From the perspective of causing the water-insoluble substance to uniformly dissolve in the water in mixing apparatus C, the temperature and pressure within mixing apparatus C are suitably higher than the temperature and pressure at which the water and water-insoluble substance are uniformly miscible.

The residence time from flow merger B to the outlet of mixing apparatus C changes with the capacity of mixing apparatus C and with the flow rate of the water and the water-insoluble substance. When dissolving a water-insoluble substance that is weak with respect to heat and pressure in supercritical water, it is desirable to quickly conduct the subsequent cooling operation after mixing the water and the water insoluble substance. Thus, for example, a setting to within a range of 0.01 to 90 seconds is suitable.

In the device shown in the schematic diagram of FIG. 2, when preparing a water-in-oil (W/O) type emulsion, the method of feeding the water-insoluble substance to a heating device having a heating coil and feeding the water to flow merger B is desirable. The mixing ratio of the water and water-insoluble substance is not specifically limited and can be suitably determined based on the emulsion being targeted. When forming an oil-in-water (O/W) type emulsion, the water-insoluble substance can fall within a range of 0.1 to 50 parts by volume per 100 parts by volume of water. When preparing a water-in-oil (W/O) type emulsion, the water can fall within a range of 1 to 50 parts by volume per 100 parts by volume of water-insoluble substance. However, these ranges are but examples and are not intended as limitations. The type of emulsion being formed will also vary with the type of surfactant employed in step (2).

Step (2)

In step (2), the product of water and the water-insoluble substance solved each other that has been prepared in step (1) is cooled (quenched) in the presence of a surfactant to obtain a liquid in which the water-insoluble substance is dispersed or a liquid in which water is dispersed in the water-insoluble substance. Specifically, (A) the product comprised of water and the water-insoluble substance solved each other that has been prepared in step (1) and a surfactant are mixed and then cooled, or (B) a surfactant is mixed in while cooling the product of water and a water-insoluble substance solved each other that has been prepared in step (1), after which the mixture is cooled. Alternatively (C), the water-insoluble substance and the surfactant are added to the water either separately or all at once in step (1) to prepare a product comprised of the water-insoluble substance, a surfactant, and water solved each other, which is then cooled in step (2). In the case of (C), the surfactant can be supplied through flow merger B in the device shown in FIG. 2. In the cases of (A) and (B), the surfactant or an aqueous solution of the surfactant is fed in a flow merger D disposed near the outlet of mixing apparatus C. However, in the case of (B), a cooling device (not shown) is present between mixing apparatus C and flow merger D. From the perspective of forming an emulsion containing minute liquid droplets, it is suitable for the cooling in the presence of a surfactant to be quenching. In the cases of (A) and (B), when the temperature at the point where the surfactant is mixed in is excessively low, it becomes difficult to achieve a quenching effect, which tends to make it difficult to obtain an emulsion containing minute liquid droplets.

From the perspective of obtaining an emulsion containing minute liquid droplets, the liquid that is fed to the cooling device in the presence of a surfactant is suitably cooled, for example, at a rate of 10° C./second or more, desirably 100 to 1,000° C., to a temperature of at least 100° C. Cooling at this rate yields an emulsion in which the water-insoluble substance is finely dispersed in water, or an emulsion in which water is finely dispersed in the water-insoluble substance.

The type and mixing ratio of the surfactant are not specifically limited. Surfactants of the types that are commonly employed in emulsification can be suitably employed. The mixing proportions can also be suitably set to quantities that are ample for maintaining a desired state of emulsification. Surfactants in the form of nonionic surfactants, cationic surfactants, anionic surfactants, water-soluble polymers, and the like can be suitably employed based on the type of emulsion desired. The mixing ratio of the surfactant can be suitably determined based on the results indicated in the Examples in consideration of the threshold micelle concentration and the like of the surfactant employed since there is no change in the particle diameter of the liquid droplets in the emulsion obtained above a prescribed level.

According to the method of the present invention, an emulsion can be manufactured over a period of from 10 seconds to several tens of seconds from the mixing with supercritical water to the preparation of an emulsion. The average particle diameter of the liquid droplets contained in the emulsion that is manufactured will vary with the conditions. By way of example, it will fall within a range of 40 to 500 nm, desirably within a range of 40 to 400 nm, preferably within a range of 40 to 300 nm, and more preferably, within a range of 40 to 200 nm. The emulsion obtained can be used based on the components as a pharmaceutical, cosmetic, food, ink, paint, or the like.

EXAMPLES

The present invention will be described more specifically through Examples. However, the present invention is not limited to these Examples. In the Examples, unless specifically indicated otherwise, "%" is based on volume.

Samples

Hydrocarbons in the form of decane, dodecane, and tetradecane (all of which were made by Wako Pure Chemical Industries, Ltd.) were employed.

A nonionic surfactant in the form of Brij97 (made by Sigma-Aldrich) was employed as the surfactant. The chemical formula of Brij97 is given below.

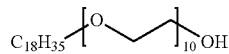

Experimental Device (Supercritical Water Supplying Device)

A flow-through apparatus was developed in which a uniform solution of water and hydrocarbon was produced under high temperature and high pressure, an aqueous solution of surfactant was admixed, quenched the mixture, and then fine oil droplets was precipitated while stabilizing them. This apparatus was used to conduct the experiments. FIG. 2 shows a schematic diagram of the apparatus. Hydrocarbons, surfactants, and the like end up thermally decomposing when processed at high temperatures. However, since heating was conducted within several tens of seconds within this apparatus, thermal decomposition at elevated temperatures was avoided. The volumes of the various parts of the device shown in FIG. 2 were as follows.

T1-T2: 0.7 mL
T2-T3: 0.2 mL
T3-T4: 0.2 mL

Experimental Procedure

Using the apparatus shown in the schematic diagram of FIG. 2, a uniform solution was prepared by causing a hydrocarbon to flow into water that had been preheated to a supercritical state by a preheating coil. A surfactant was then admixed, after which the mixture was quenched with a cooling device. The quenching caused minute oil droplets to precipitate, forming an emulsion. The pressure was maintained at 25 MPa from the preheating coil to the pressure valve. Temperature gages are indicated at each of T1, T2, and T3. With the present apparatus, it is possible to control a large number of parameters, such as 1. the processing temperature; 2. the flow rates of water, hydrocarbon, and surfactant; 3. the proportion of water and hydrocarbon; 4. the type of hydrocarbon; and 5. the type and concentration of surfactant. Subsequently, testing was conducted by varying primarily the flow rate, processing temperature, and surfactant concentration. Table 1 gives the modified conditions. The concentration of surfactant refers to the concentration of the surfactant in the aqueous solution added at T3. The surfactant concentration in the final emulsion was ½ the value shown in the Table.

Modified Conditions

Processing temperature: The processing temperature refers to processing temperature settings A, B, and C in the schematic diagram of FIG. 2. (A: preheating coil; B: mixing point of water and hydrocarbon; C: between point where hydrocarbon admixed and point where surfactant admixed)

Flow rate: The flow rates of the water, hydrocarbon, and surfactant were each varied.

TABLE 1

| Modified conditions | |
|---|---|
| Modified conditions | |
| Flow rate (ml/min) (water: hydrocarbon: surfactant) | flow rate 20 ml/min = 8: 2: 10<br>flow rate 10 ml/min = 4: 1: 5<br>flow rate 6 ml/min = 2.4: 0.6: 3.0 |
| Processing temperature | 440° C., 430° C., 420° C., 410° C., 400° C., 395° C., 390° C., 370° C., 340° C., 240° C., 24° C. (room temp.) |
| Surfactant concentration (mM) Brij97 | 1, 5, 10, 15, 20, 25, 30, 40, 50, 60, 70, 80, 90, 100 |

Measurement of Average Diameter

The average diameter and polydispersity of the hydrocarbon liquid droplets in the emulsion were determined by the dynamic light-scattering method. The emulsion was diluted 10,000-times with water and the average diameter was measured by the dynamic light scattering method with an FDLS-1200 made by Otsuka Electronics Co., Ltd. at 25° C. A standing time of 15 minutes prior to the start of measurement was uniformly adopted.

The results of the various experiments are given in Tables 3 to 9.

The Effects of Flow Rate and Surfactant Concentration

Figure 3:
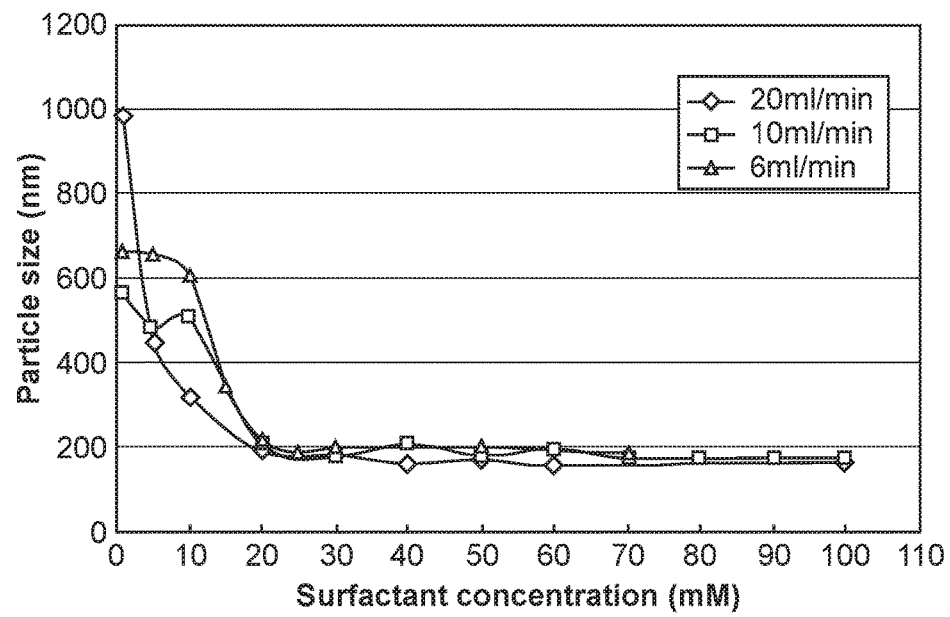
FIG. 3 shows the change in size of oil droplets relative to flow rate and surfactant concentration.

FIG. 3 gives the change in the size of the oil droplets when the flow rates of water, hydrocarbon, and surfactant, and the concentration of surfactant, were varied. The blue line denotes the results for 8 mL/min of water, 2 mL/min of hydrocarbon, and 10 mL/min of surfactant. The red line denotes the results for 4 mL/min of water, 1 mL/min of hydrocarbon, and 5 mL/min of surfactant. And the yellow line indicates the results for 2.4 mL/min of water, 0.6 mL/min of hydrocarbon, and 3 mL/min of surfactant. The pressure was 25 MPa. A processing temperature of 440° C. at the preheating coil, 440° C. at the point where water and hydrocarbon were admixed, and 445° C. between the point where water and hydrocarbon were admixed and the mixing point where the surfactant was admixed were uniformly adopted. Based on these results, it was found that as the surfactant concentration increased, the size of the oil droplets decreased. However, there was almost no change at concentrations of 20 mM and above. The flow rate had almost no effect on the size of the oil droplets. The smallest oil droplet size was 159 nm. The conditions that produced it were a flow rate of 20 mL and a surfactant concentration of 60 mM.

Figure 4:
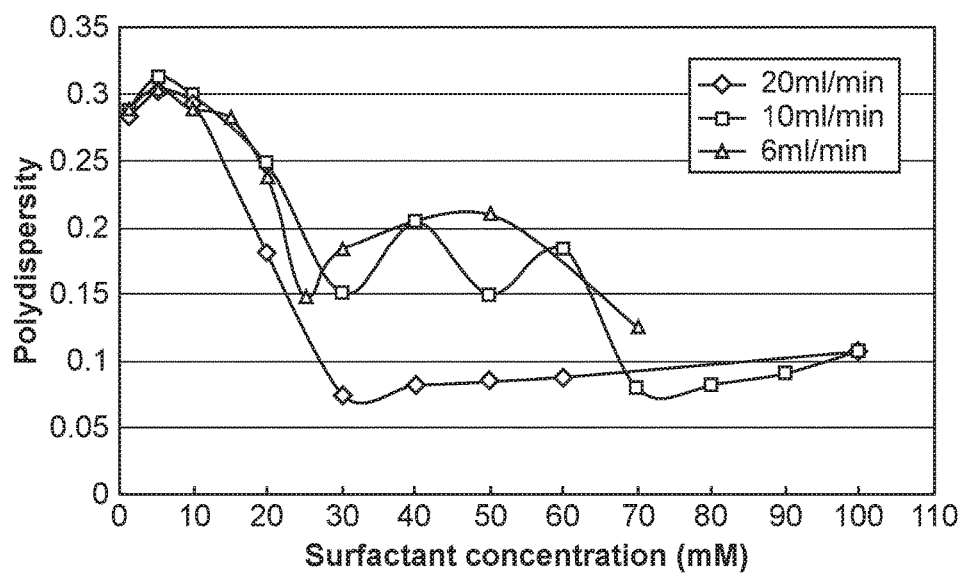
FIG. 4 shows the change in polydispersity for flow rates and surfactants.

FIG. 4 shows the polydispersity with variation in the flow rates of water, hydrocarbon, and surfactant; and in the concentration of surfactant. The conditions are the same as in FIG. 3. Based on these results, it was found that as the surfactant concentration increased, the polydispersity tended to decrease. However, at flow rates of 20 mL/min and 10 mL/min, the polydispersity gradually increased at 70 mM and above. This was attributed to the lack of a smooth flow due to an excessive concentration of surfactant, precluding uniform admixture.

Figure 5:
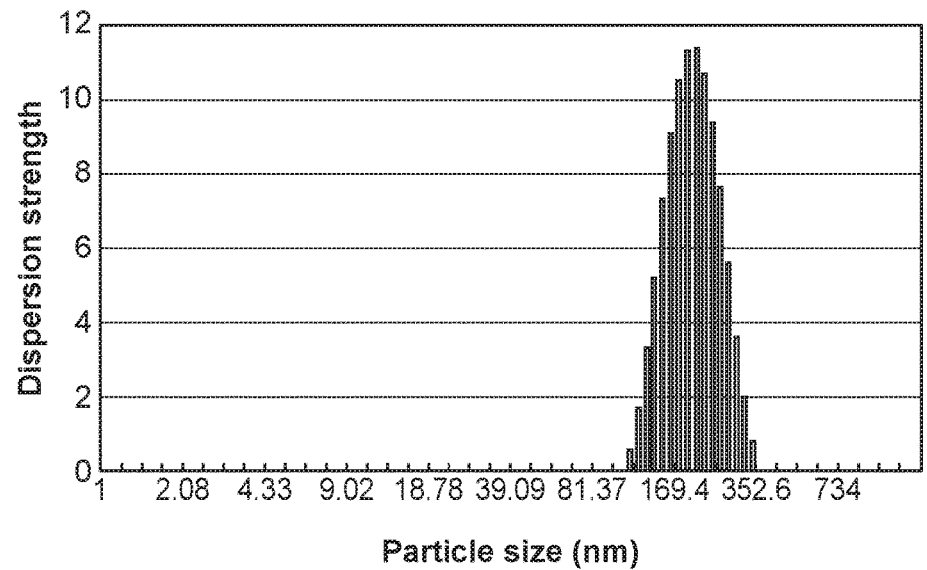
FIG. 5 shows the size distribution of oil droplets obtained under optimal conditions.

Under the conditions of a flow rate of 20 mL and a surfactant concentration of 30 mM, the polydispersity was lowest, yielding a stable emulsion with a uniform average particle diameter of 181 nm (FIG. 5).

The Effect of the Processing Temperature

Table 2 shows the particle diameter at various processing temperatures, the polydispersity, and the temperatures measured by temperature gages T1, T2, and T3.

Figure 6A:
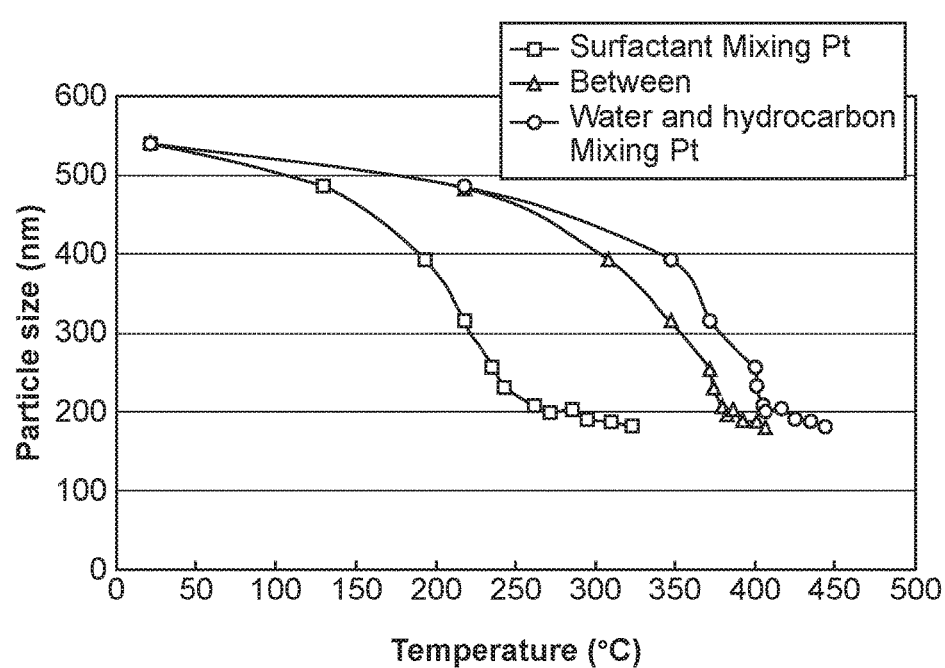
FIG. 6A shows the size change for processing temperatures (T1, T2, and T3).
Figure 6B:
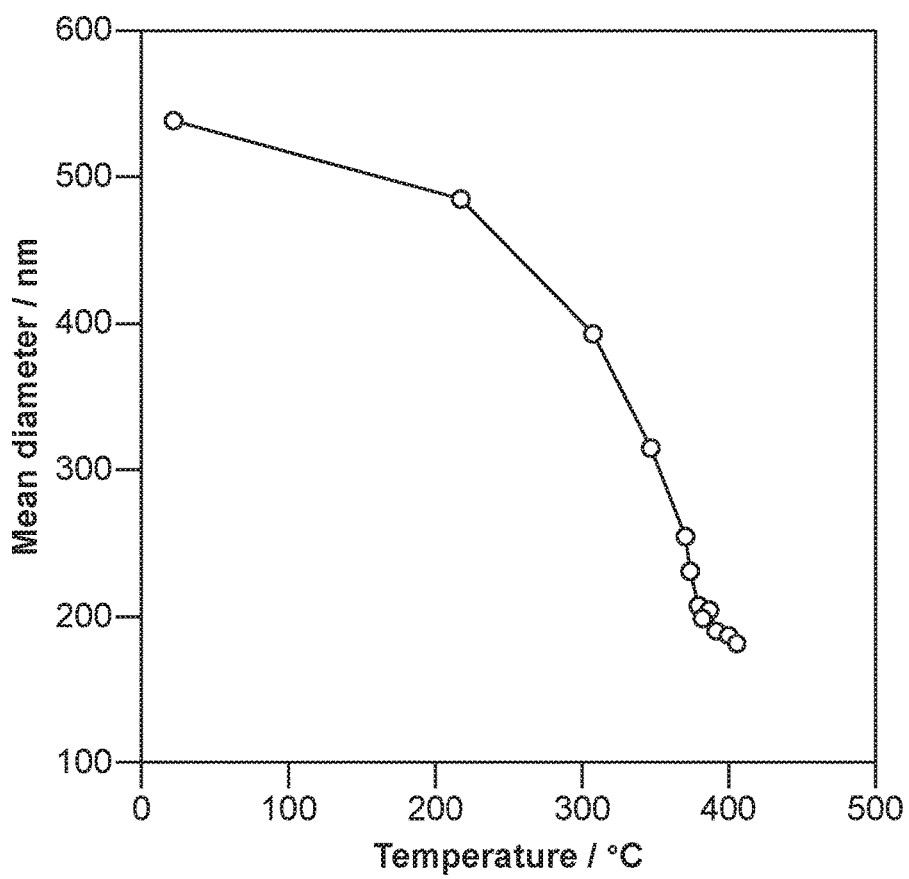
FIG. 6B shows the size change for processing time (T2).

FIG. 6A shows the change in the size of the oil droplets with respect to change in processing temperatures (T1, T2, and T3). The square (■) denotes the temperature T3 at the point of admixture of the surfactant. The triangle (▲) shows temperature T2 between the point of admixture of surfactant and the point of admixture of hydrocarbon. And the circle (○) shows the temperature T1 at the point of admixture of the hydrocarbon. The pressure was set to 25 MPa and the flow rates were set to 8 mL/min of water, 2 mL/min of hydrocarbon, and 10 mL/min of surfactant. The concentration of surfactant (the concentration in the surfactant aqueous solution when added at T3) was a uniform 30 mM. As shown in FIG. 6B, when temperature T2 was lowered, the particle size increased sharply at a certain temperature boundary. It was thus thought that the temperature at which the hydrocarbon dissolved in water, particularly temperature T2, greatly affected the particle size.

Figure 7A:
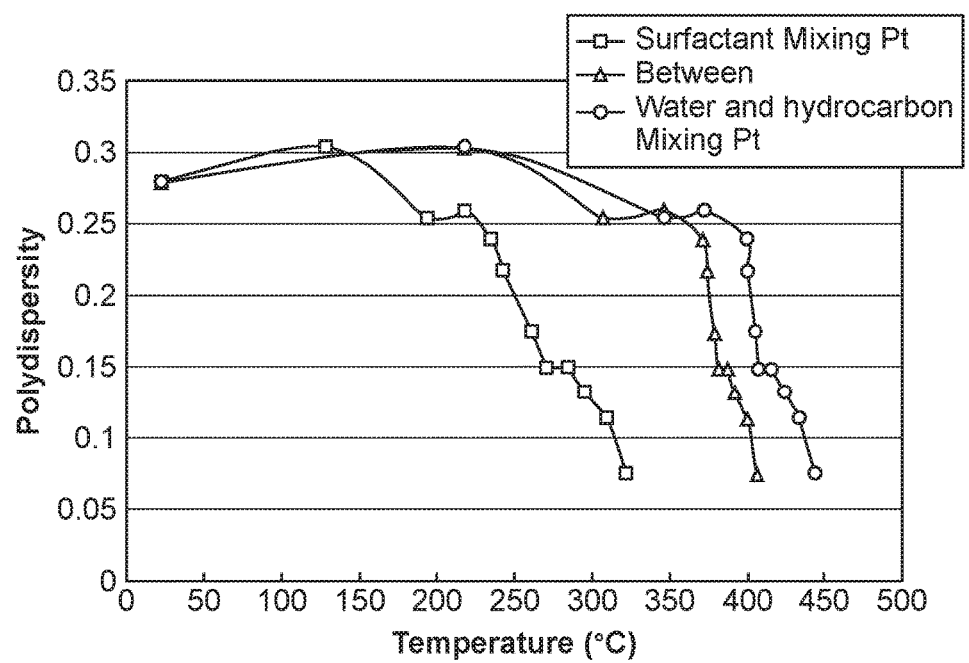
FIG. 7A shows the change in polydispersity for processing temperatures (T1, T2, and T3).
Figure 7B:
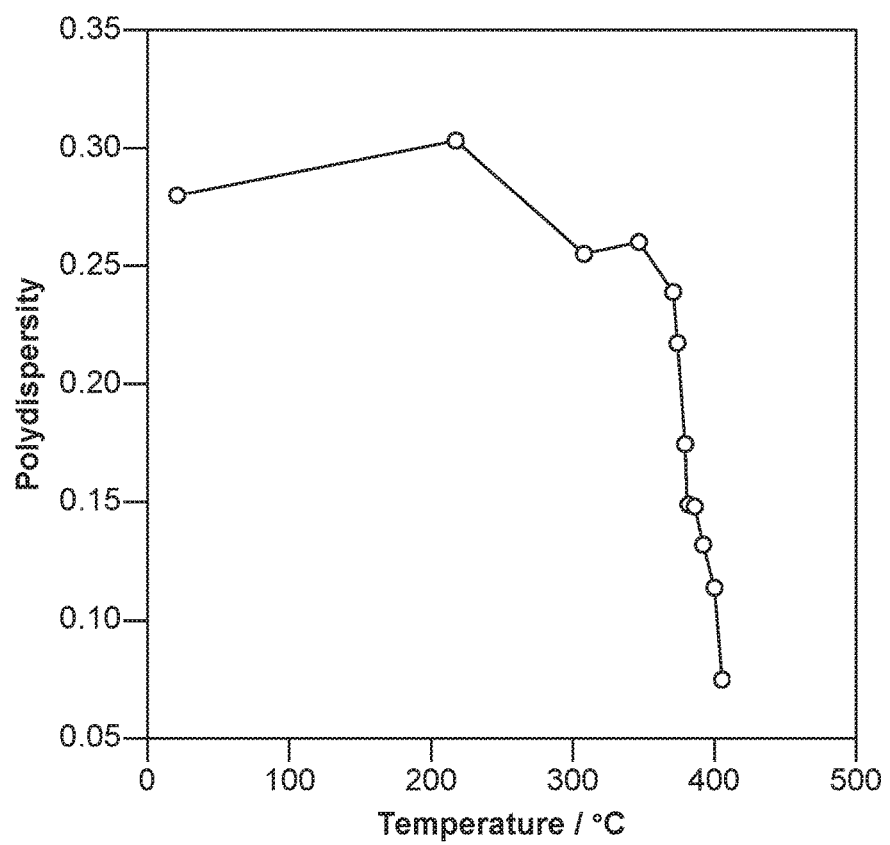
FIG. 7B shows the change in polydispersity for processing temperature (T2).

FIG. 7A shows the change in polydispersity with change in the processing temperature (T1, T2, and T3). The conditions are all identical to those in FIG. 6. Based on these results, the particle size was found to become uniform as the particle diameter decreased. This was thought to occur because the hydrocarbon dissolved in water at and above a specific temperature, forming nuclei uniformly. Based on these results, the higher the processing temperature, the smaller the average particle diameter, yielding a monodispersion. As shown in FIG. 7B, when temperature T2 dropped to and below a specific temperature, the solubility of the hydrocarbon decreased, precluding uniform admixture, the particle size increased, and polydispersity resulted. Temperature T2 was thought to be important to the relation between particle size and temperature, as well.

Figure 8:
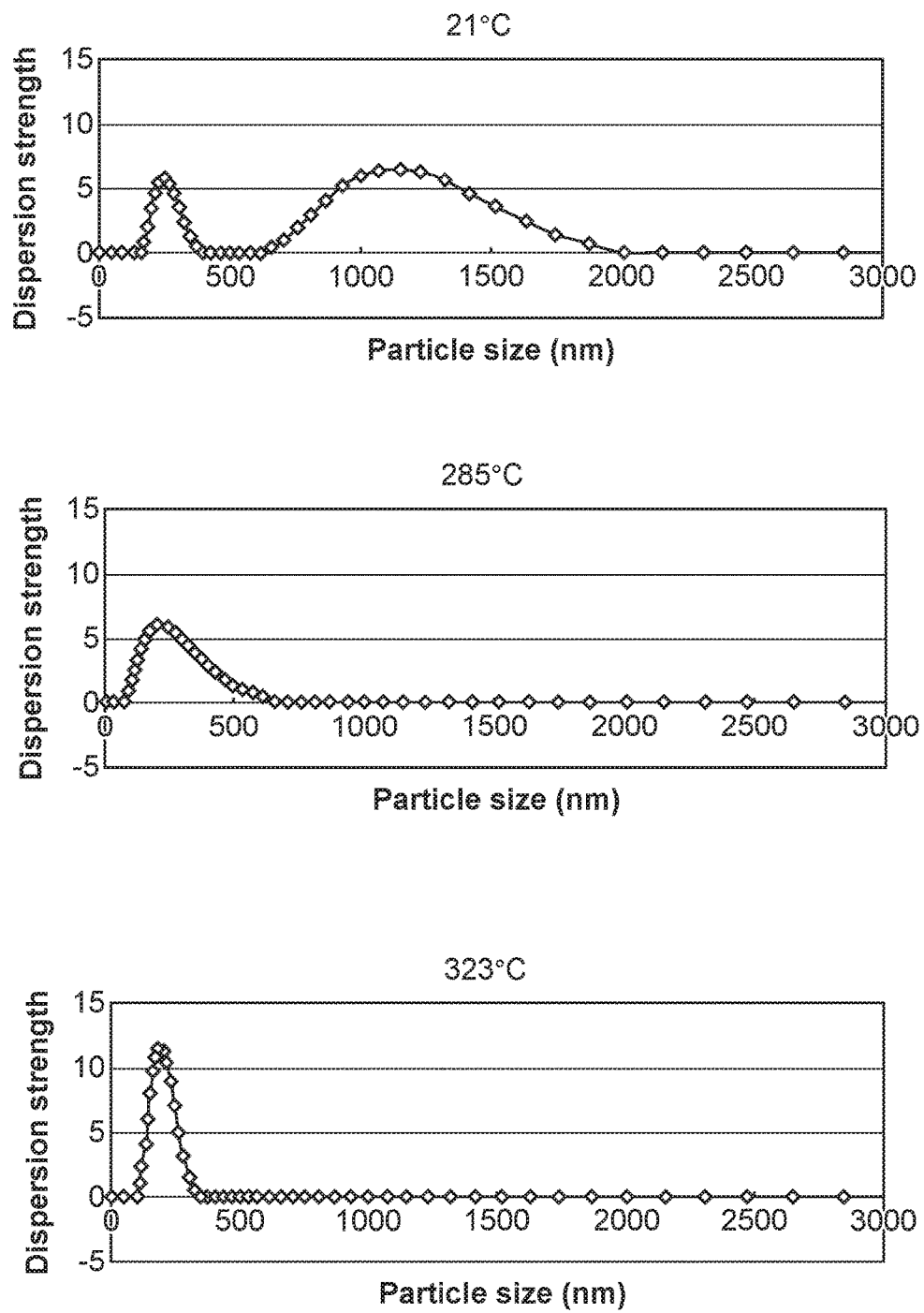
FIG. 8 shows the size distribution of oil droplets relative to processing temperature.
Figure 9:
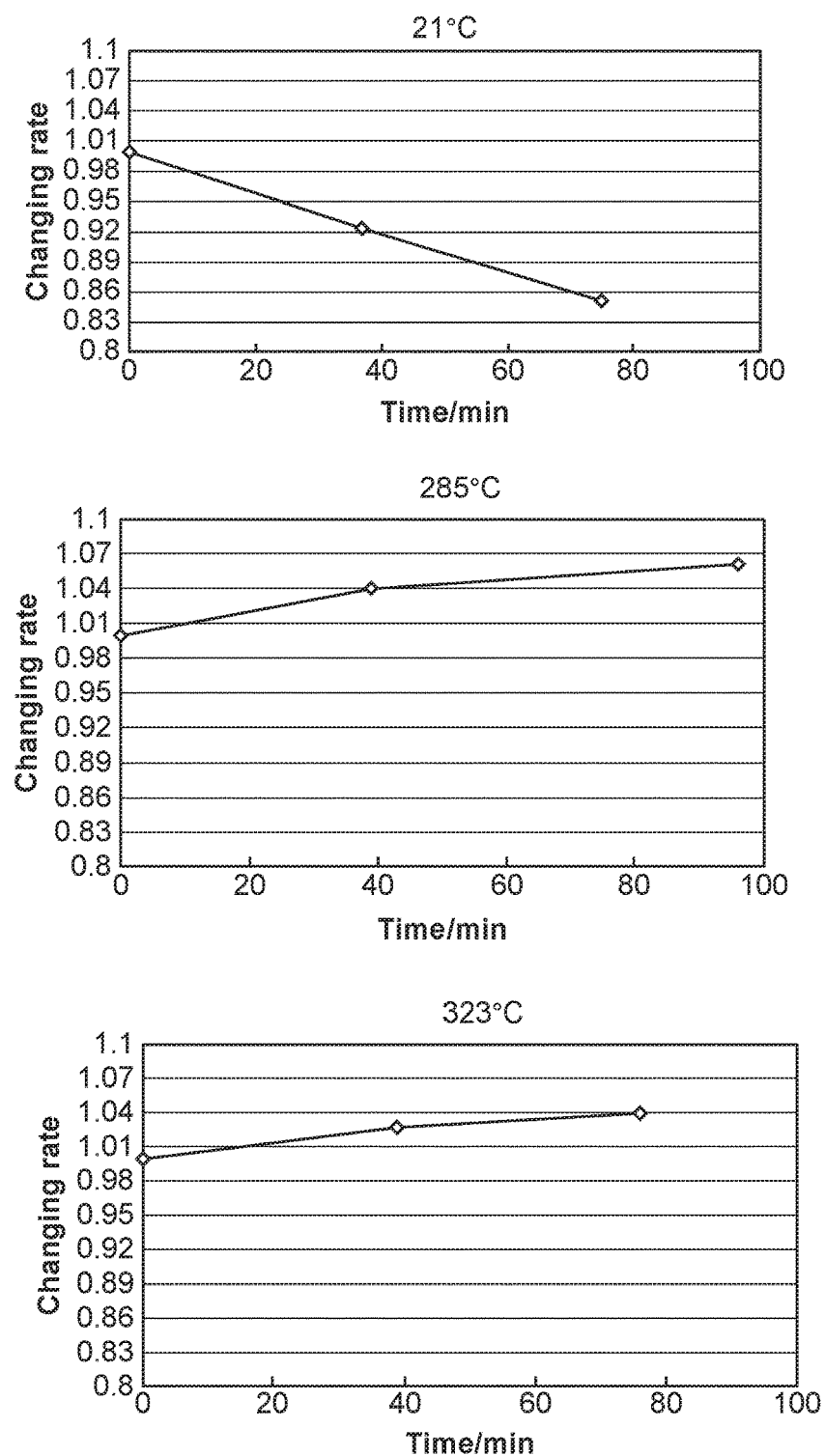
FIG. 9 shows the rate of change in the size of oil droplets relative to time elapsed.

FIG. 8 shows the size distribution of the oil droplets for various processing temperatures. FIG. 9 shows the rate of change in oil droplet size over time. Each shows just the results for 21° C., 272° C., and 323° C. The temperature given in Tables 8 and 9 is the temperature T3 at the point of admixture of surfactant (the temperature at the surfactant Mixing Pt in Table 2). In both cases, the conditions are identical to those in the case shown in FIG. 6, and are indicated in Table 2. The T2 temperature of the results given in FIGS. 8 and 9 can be understood from Table 2. That is, when T3 was 21° C., T2 was 22° C. When T3 was 272° C., T2 was 382° C. And when T3 was 323° C., T2 was 406° C.

Based on FIG. 8, it was understood that the higher processing temperatures (T2 and T3) became, the smaller the oil droplet size became and the narrower the distribution became. Based on FIG. 9, it will be understood that when processing was conducted at low temperatures (T2 and T3), the size of the oil droplets decreased over time. However, when processing was conducted at high temperatures (T2 and T3), the size increased over time. This result was thought to have occurred because when processing was conducted at elevated temperature, uniform large oil droplets joined together, increasing in size. Conversely, when processing was conducted at low temperature, large oil droplets and small oil droplets were jumbled together, the large oil droplets rose over time, and the smaller oil droplets gathered toward the bottom, which came in contact with the laser. For these reasons, the temperature (T2) at which hydrocarbons dissolved in (became miscible with) water was thought to specifically relate to a small particle size and polydispersity. That is, in the apparatus of the present Example, it was found to be important for the temperature T2 between the point of admixture of surfactant and the point of admixture of hydrocarbon to be greater than or equal to the temperature at which the water and the hydrocarbon became miscible in terms of preparing an emulsion of small particle size.

TABLE 2

Particle diameter and polydispersity
for various processing temperatures

| Processing temperature | Surfactant Mixing Pt | Between | Water and hydrocarbon Mixing Pt | Average particle diameter | Polydispersity |
|---|---|---|---|---|---|
| 440° C. | 323° C. | 406° C. | 444° C. | 181 nm | 0.075 |
| 430° C. | 310° C. | 400° C. | 434° C. | 187 nm | 0.114 |
| 420° C. | 295° C. | 392° C. | 425° C. | 190 nm | 0.132 |
| 410° C. | 285° C. | 387° C. | 417° C. | 204 nm | 0.148 |
| 400° C. | 272° C. | 382° C. | 407° C. | 199 nm | 0.149 |
| 395° C. | 262° C. | 379° C. | 405° C. | 207 nm | 0.175 |
| 392° C. | 244° C. | 374° C. | 400° C. | 231 nm | 0.217 |
| 390° C. | 236° C. | 371° C. | 400° C. | 255 nm | 0.239 |
| 370° C. | 218° C. | 347° C. | 372° C. | 315 nm | 0.260 |
| 340° C. | 194° C. | 308° C. | 348° C. | 393 nm | 0.255 |
| 240° C. | 130° C. | 218° C. | 246° C. | 485 nm | 0.303 |
| 24° C. | 21° C. | 22° C. | 20° C. | 538 nm | 0.280 |

Processing temperature: The heating temperature settings of A, B, and C in the schematic diagram of FIG. 2.
The temperature settings were identical at A, B, and C (A: preheating coil; B: point of admixture of water and hydrocarbon; C: between the point of admixture of hydrocarbon and the point of admixture of surfactant).
The surfactant Mixing Pt: The temperature indicated by the temperature gage at T3 in the schematic diagram of FIG. 2.
Between: The temperature indicated by the temperature gage at T2 in the schematic diagram of FIG. 2. Due to the effect in the subsequent cooling step, the temperature indicated is lower than T1.
Water and hydrocarbon Mixing Pt: The temperature indicated by the temperature gage of T1 shown in the schematic diagram of FIG. 2.

Example 1: Preparation of Decane/Water Emulsion

Commercial decane and water were mixed in a ratio of 1:4 at 444° C. and 25 MPa and then heated for about 4.5 seconds at a temperature of 444 to 406° C. While maintaining the pressure, the mixture and water containing 30 mM of Brij97 were mixed in a ratio of 1:1. The mixture was then cooled to 42° C. (temperature T4 in FIG. 2, identical below) in about 1.6 seconds. Further cooling was conducted and the mixture was depressurized, yielding an emulsion containing 10% decane and 15 mM Brij97.

Dynamic light-scattering measurement of the emulsion revealed that the decane was dispersed as oil droplets with an average diameter of 181 nm.

Example 2: Preparation of Decane/Water Emulsion

In the same manner as in Example 1, decane and water were mixed in a ratio of 1:4 at 400° C. and 25 MPa and then heated for about 4.5 seconds at 400 to 374° C. While maintaining the pressure, the mixture and water containing 30 mM of Brij97 were mixed in a ratio of 1:1. The mixture was then cooled to 44° C. in about 1.6 seconds. Further cooling was conducted and the mixture was depressurized, yielding an emulsion containing 10% decane and 15 mM Brij97.

Dynamic light-scattering measurement of the emulsion revealed that the decane was dispersed as oil droplets with an average diameter of 231 nm.

Example 3: Preparation of Decane/Water Emulsion

In the same manner as in Example 1, decane and water were mixed in a ratio of 1:4 at 348° C. and 25 MPa and then heated for about 4.5 seconds at 348 to 308° C. While maintaining the pressure, the mixture and water containing 30 mM of Brij97 were mixed in a ratio of 1:1. The mixture was then cooled to 42° C. in about 1.6 seconds. Further cooling was conducted and the mixture was depressurized, yielding an emulsion containing 10% decane and 15 mM Brij97.

Dynamic light-scattering measurement of the emulsion revealed that the decane was dispersed as oil droplets with an average diameter of 393 nm.

Reference Example 1: Preparation of Decane/Water Emulsion

In the same manner as in Example 1, decane and water were mixed in a ratio of 1:4 at 21° C. and 25 MPa. While maintaining the pressure, the mixture and water containing 30 mM of Brij97 were mixed in a ratio of 1:1 and depressurized, yielding an emulsion containing 10% decane and 15 mM Brij97.

Dynamic light-scattering measurement of the emulsion revealed that the decane was dispersed as oil droplets with an average diameter of 538.

Reference Example 2: Preparation of Decane/Water Emulsion

In the same manner as in Example 1, decane and water were mixed in a ratio of 1:4 at 246° C. and 25 MPa, and heated for about 4.5 seconds at a temperature of 246 to 218° C. While maintaining the pressure, the mixture and water containing 30 mM of Brij97 were mixed in a ratio of 1:1 and the mixture was cooled to 35° C. in about 1.6 seconds. The mixture was further cooled to room temperature and depressurized, yielding an emulsion containing 10% decane and 15 mM Brij97.

Dynamic light-scattering measurement of the emulsion revealed that the decane was dispersed as oil droplets with an average diameter of 485 nm.

Example 4: Preparation of Dodecane/Water Emulsion

Commercial dodecane and water were mixed in a ratio of 0.2:9.8 at 440° C. and 25 MPa and then heated for about 4.5 seconds at a temperature of 440 to 403° C. While maintaining the pressure, the mixture and water containing 10 mM of Brij97 were mixed in a ratio of 1:1 and the mixture was cooled to 57° C. in about 1.6 seconds. The mixture was further cooled and depressurized, yielding an emulsion containing 1 dodecane and 5 mM Brij97.

Dynamic light-scattering measurement of the emulsion revealed that the dodecane was dispersed as oil droplets with an average diameter of 79 nm.

Reference Example 3: Preparation of Dodecane/Water Emulsion

In the same manner as in Example 4, dodecane and water were mixed in a ratio of 0.2:9.8 at 19° C. and 25 MPa. While maintaining the pressure, the mixture and water containing 10 mM of Brij97 were mixed in a ratio of 1:1. The mixture was depressurized, yielding an emulsion containing 1% dodecane and 5 mM Brij97.

Dynamic light-scattering measurement of the emulsion revealed that the dodecane was dispersed as oil droplets with an average diameter of 651 nm.

Reference Example 4: Preparation of Dodecane/Water Emulsion

In the same manner as in Example 4, dodecane and water were mixed in a ratio of 0.2:9.8 at 343° C. and 25 MPa and then heated for about 4.5 seconds at a temperature of 343 to 321° C. While maintaining the pressure, the mixture and water containing 10 mM of Brij97 were mixed in a ratio of 1:1 and the mixture was cooled to 50° C. in about 1.6 seconds. The mixture was further cooled to room temperature and depressurized, yielding an emulsion containing 1% dodecane and 5 mM Brij97.

Dynamic light-scattering measurement of the emulsion revealed that the dodecane was dispersed as oil droplets with an average diameter of 436 nm.

Reference Example 5: Preparation of Dodecane/Water Emulsion

In the same manner as in Example 4, dodecane and water were mixed in a ratio of 0.2:9.8 at 396° C. and 25 MPa and then heated for about 4.5 seconds at a temperature of 396 to 377° C. While maintaining the pressure, the mixture and water containing 10 mM of Brij97 were mixed in a ratio of 1:1 and the mixture was cooled to 56° C. in about 1.6 seconds. The mixture was further cooled to room temperature and depressurized, yielding an emulsion containing 1% dodecane and 5 mM Brij97.

Dynamic light-scattering measurement of the emulsion revealed that the dodecane was dispersed as oil droplets with an average diameter of 355 nm.

Example 5: Preparation of Tetradecane/Water Emulsion

Commercial tetradecane (made by Wako Pure Chemical Industries, Ltd.), water, and water containing 20 mM Brij97 were mixed in a ratio of 0.2:5.0:5.0 at 438° C. and 25 MPa and then heated for about 3.0 seconds at a temperature of 438 to 396° C. While maintaining the pressure, the mixture and water were mixed in a ratio of 10.2:9.8 and the mixture was cooled to 62° C. in about 1.3 seconds. The mixture was further cooled and depressurized, yielding an emulsion containing 1% tetradecane and 5 mM Brij97.

Dynamic light-scattering measurement of the emulsion revealed that the tetradecane was dispersed as oil droplets with an average diameter of 89 nm.

Reference Example 6: Preparation of Tetradecane/Water Emulsion

In the same manner as in Example 5, tetradecane, water, and water containing 20 mM Brij97 were mixed in a ratio of 0.2:5.0:5.0 at 23° C. and 25 MPa. While maintaining the pressure, the mixture and water were mixed in a ratio of 10.2:9.8 and the mixture was depressurized, yielding an emulsion containing 1% tetradecane and 5 mM Brij97.

Dynamic light-scattering measurement of the emulsion revealed that the tetradecane was dispersed as oil droplets with an average diameter of 620 nm.

Reference Example 7: Preparation of Tetradecane/Water Emulsion

In the same manner as in Example 5, tetradecane, water, and water containing 20 mM Brij97 were mixed in a ratio of 0.2:5.0:5.0 at 244° C. and 25 MPa and then heated for about 3.0 seconds at a temperature of 244 to 215° C. While maintaining the pressure, the mixture and water were mixed in a ratio of 10.2:9.8 and the mixture was cooled to 36° C. in about 1.3 seconds. The mixture was further cooled and depressurized, yielding an emulsion containing 1% tetradecane and 5 mM Brij97.

Dynamic light-scattering measurement of the emulsion revealed that the tetradecane was dispersed as oil droplets with an average diameter of 334 nm.

The present invention is useful in all fields relating to emulsions. For example, it is useful in the manufacturing of pharmaceuticals, cosmetics, foods, inks, and paints.

The invention claimed is:

1. A method for producing an emulsion comprising the steps of:
   (1a) feeding continuously or intermittently either (i) a water-insoluble substance that is to be emulsified and water that is heated and pressurized, respectively or (ii) water and a water-insoluble substance that is to be emulsified and that is heated and pressurized, respectively into a first flow merger in which liquids fed through multiple liquid supply ports are mixed and discharged through a single liquid outlet, and then
   (1b) feeding the water and water-insoluble substance that are merged in the first flow merger to a mixing apparatus to maintain under conditions of temperature and pressure which are approximately at the vapor-liquid critical point of water for a period in a range of 0.01 to 90 seconds to cause the water and the water-insoluble substance to become freely miscible; and
   (2a) feeding the freely miscible product comprised of the water-insoluble substance and water and a surfactant, respectively into a second flow merger in which liquids fed through multiple liquid supply ports are mixed and discharged through a single liquid outlet, under conditions of temperature and pressure which are approximately at the vapor-liquid critical point of water, and
   (2b) feeding the obtained mixture of the freely miscible product and the surfactant into a cooling device to cool the obtained mixture of the freely miscible product and the surfactant at a rate of 100° C./second to 1000° C./second to a temperature of 100° C. or less to obtain a liquid comprised of the water-insoluble substance dispersed in water or a liquid comprised of water dispersed in the water-insoluble substance.

2. The method according to claim 1, wherein the temperature approximately at the vapor-liquid critical point of water is a temperature of 300° C. or higher and the pressure approximately at the vapor-liquid critical point of water is a pressure of 20 MPa or greater.

3. The method according to claim 1, wherein a period for the maintaining in step (1b) falls within a range of 0.01 to about 4.5 seconds.

4. The method according to claim 3, wherein a period for the maintaining in step (1b) falls within a range of 0.01 to about 3 seconds.

5. The method according to claim 1, wherein the period for the maintaining in step (1b) falls within a range of 0.01 to 14 seconds.

6. The method according to claim 1, wherein the period for the maintaining in step (1b) falls within a range of 0.01 to 8.4 seconds.

7. The method according to claim 1, wherein the period for the maintaining in step (1b) falls within a range of 0.01 to 4.2 seconds.

8. A method for producing an emulsion, comprising the steps of:
   (1a) feeding continuously or intermittently either a water-insoluble substance that is to be emulsified, a surfactant and water that is heated and pressurized or water, a water-insoluble substance that is to be emulsified and that is heated and pressurized and a surfactant independently into a first flow merger in which liquids fed through multiple liquid supply ports are mixed and discharged through a single liquid outlet,
   (1b) feeding the water, the surfactant and the water-insoluble substance that are merged in the first flow merger to a mixing apparatus to maintain under conditions of temperature and pressure which are approximately at the vapor-liquid critical point of water for a period in a range of 0.01 to 90 seconds to cause the water, the surfactant and the water-insoluble substance that is to be emulsified to become freely miscible; and
   (2) feeding the freely miscible product comprised of the water-insoluble substance, the surfactant and water into a cooling device to cool the freely miscible product comprised of the water-insoluble substance, the surfactant and water at a rate of 100° C./second to 1000° C./second to a temperature of 100° C. or less to obtain a liquid comprised of the water-insoluble substance dispersed in water or a liquid comprised of water dispersed in the water-insoluble substance.

9. The method according to claim 8, wherein the temperature approximately at the vapor-liquid critical point of water is a temperature of 300° C. or higher and the pressure approximately at the vapor-liquid critical point of water is a pressure of 20 MPa or greater.

10. The method according to claim 8, wherein a period for the maintaining in step (1b) falls within a range of 0.01 to about 4.5 seconds.

11. The method according to claim 10, wherein a period for the maintaining in step (1b) falls within a range of 0.01 to about 3 seconds.

* * * * *